United States Patent [19]
Durda et al.

[11] Patent Number: 5,078,923
[45] Date of Patent: Jan. 7, 1992

[54] AERATION APPARATUS HAVING A DEICING MECHANISM AND CONTROL CIRCUIT THEREFOR

[75] Inventors: Joseph Durda, Wazatta; Thomas G. Giese, Edina; John O. White, Eagan, all of Minn.

[73] Assignee: Aeration Industries International, Inc., Chaska, Minn.

[21] Appl. No.: 405,071

[22] Filed: Sep. 13, 1989

Related U.S. Application Data

[63] Continuation-in-part of Ser. No. 275,522, Nov. 23, 1988, Pat. No. 4,882,099.

[51] Int. Cl.$^5$ .............................................. B01F 3/04
[52] U.S. Cl. ................................. 261/142; 261/87; 261/120
[58] Field of Search .................. 261/87, 142, 120; 219/535

[56] References Cited

U.S. PATENT DOCUMENTS

| | | | |
|---|---|---|---|
| 2,506,574 | 5/1950 | Boydstun | 219/535 |
| 2,740,035 | 3/1956 | Young, Jr. | 219/535 |
| 2,748,252 | 5/1956 | Williams et al. | 219/535 |
| 3,355,572 | 11/1967 | Chron | 219/535 |
| 3,836,130 | 9/1974 | Earhart et al. | 210/242.2 |
| 4,110,419 | 8/1978 | Miller | 261/142 |
| 4,216,091 | 8/1980 | Mineau | 210/242.2 |
| 4,240,990 | 12/1980 | Inhofer et al. | 210/220 |
| 4,280,911 | 7/1981 | Durda et al. | 261/87 |
| 4,308,221 | 12/1981 | Durda | 261/87 |
| 4,581,521 | 4/1986 | Grise | 219/535 |
| 4,882,099 | 11/1989 | Durda et al. | 261/87 |

Primary Examiner—Tim Miles
Attorney, Agent, or Firm—Banner, Birch, McKie & Beckett

[57] ABSTRACT

An aspirator aerator for inducing the flow of atmospheric air at high velocity below the surface of a substance so as to allow oxygen to freely and quickly transfer into the substance. The aerator includes an outer tubular housing having an inner tube disposed therein, one end of the housing being associated with an aspiration mechanism for inducing fluid flow through the aerator, the other end of the housing being associated with a drive for driving the aspiration mechanism. A heater is disposed substantially around the outer surface of the outer tubular housing and generates sufficient heat for deicing the aerator. Insulation is disposed substantially around the heater element to cause heat generated by the heater to substantially flow through the outer tubular housing. The aerator may further be provided with a control circuit for controlling the operation of the drive and deicing mechanism in response to a signl denoting the presence or absence of icing conditions.

19 Claims, 4 Drawing Sheets

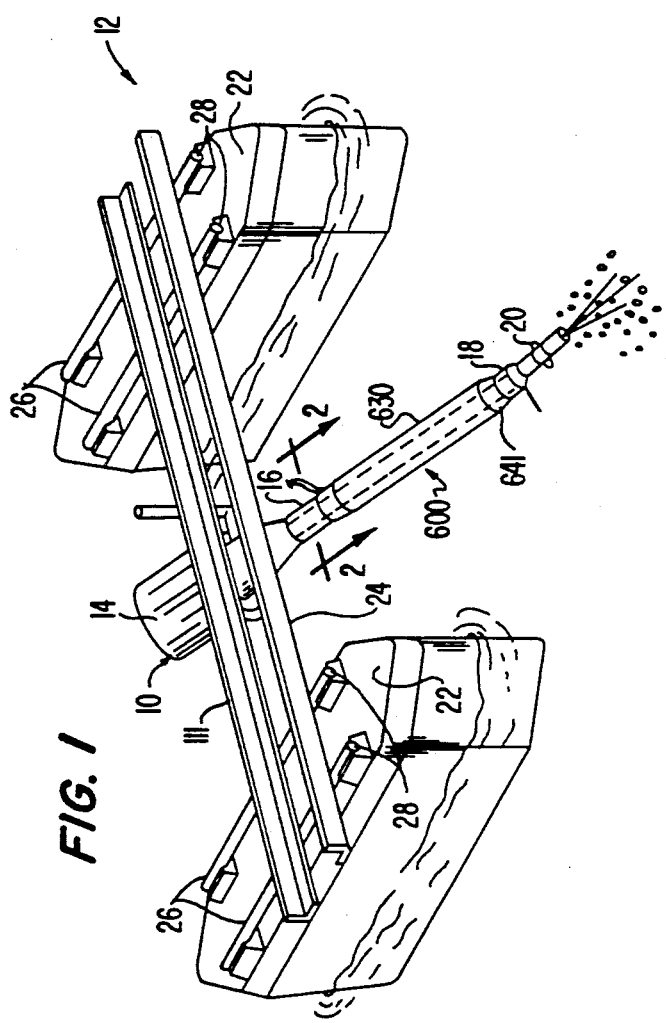
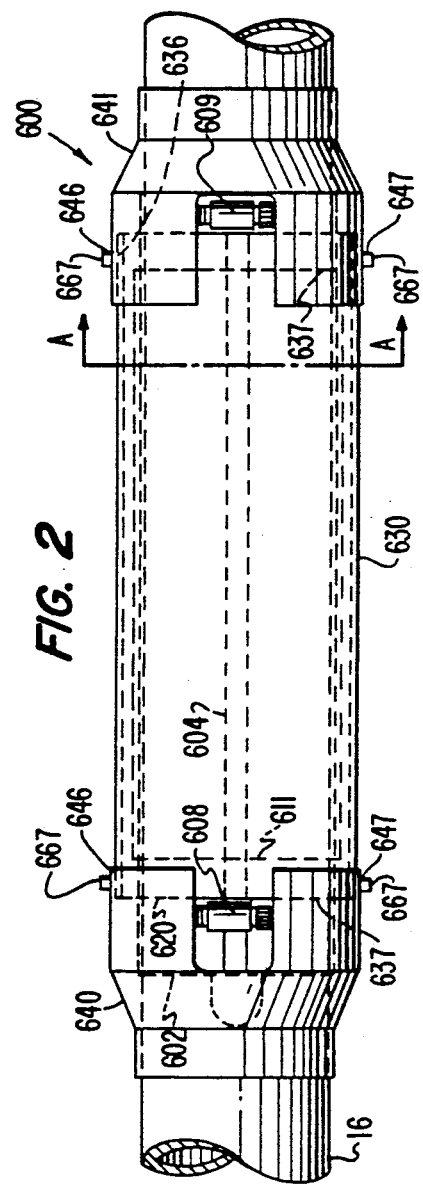
FIG. 1
FIG. 2

AERATION APPARATUS HAVING A DEICING MECHANISM AND CONTROL CIRCUIT THEREFOR

RELATED APPLICATIONS

This application is a continuation-in-part application of application Ser. No. 275,522 filed Nov. 23, 1988, now U.S. Pat. No. 4,882,099.

TECHNICAL FIELD

The present invention broadly relates to an apparatus and method for the treatment of water by aeration. More particularly, the present invention relates to an aeration apparatus having a deicing mechanism and a control circuit therefor which is responsive to an icing condition.

BACKGROUND OF THE INVENTION

Aeration apparatus are utilized in the treatment of water for the purpose of increasing the dissolved oxygen content of the water. A certain amount of dissolved oxygen is required for the life of fish and other aquatic organisms. Furthermore, dissolved oxygen is also required to prevent the formation of offensive odors and to break down organic matter in water. Therefore, aeration apparatus are especially useful in the biological purification of waste waters which contain organic solvents. It has also been found useful to increase the oxygen content of other substances, such as sludge.

Aeration apparatus used to increase the dissolved oxygen content of various substances are known. For example, U.S. Pat. No. 4,240,990 to Imhofer et al. and U.S. Pat. No. 4,280,911 to Durda et al. disclose motor driven propeller-type aerators of which the disclosures therein are hereby incorporated herein. However, such shaft powered aerators may be subjected to hostile conditions, such as temperatures below freezing. For example, if an aerator is shut off intentionally or unexpectedly due to temporary power loss, the turbulence caused by the aerator ceases and ice typically forms at the water surface and extends several inches therebelow due to the freezing temperatures and the lack of fluid flow. As a result, the aerator shaft may freeze up within the housing. Ice could also form immediately after shutdown at a location lower in the aerator assembly where the shaft bearing is positioned, if the aerator components were cooled below freezing due to colder ambient air and consequently colder air flowed through the aerator components before shutdown.

Thus, freezing temperatures may freeze the dynamic mechanisms of the aerator. As a result, those mechanisms may then undergo fatigue or even failure due to the torque of the motor when it is restarted. On the other hand, the frozen dynamic mechanisms could cause the motor to be overloaded. The resultant overramping of the motor would subject the motor to heat build-up which, if excessive, could permanently damage the motor windings. The damage may simply result in a reduction in the expected motor life or it may require replacement of the stator, rotor or related components of the motor. Since it is generally not cost effective to rewind a motor having less than 20 horsepower, replacement of the entire motor most likely would be necessary.

Aerator motors may include thermostatic protection devices therein to cut-off power input thereto in response to an increase in motor temperature, or include circuit breakers or fuses on their input side which would cut-off power input thereto in response to excessive current draw. However, these protective devices may prove ineffective and the motors may still overheat. These protective devices may be undersized due to error in design or inadvertent error during replacement thereof. Furthermore, such protective devices may fail to operate as intended due to latent defects therein, or failure in the contacts due to factors such as corrosion or the development of loose connections. Also, the above described protective devices may not respond to excessive current draw in time to prevent heat associated damage. Furthermore, even though such protective devices may provide a level of protection for the motor, after sensing an excessive current draw they must be replaced or reset before the motor may be restarted. Finally, these protective devices merely provide a cut-off function. They do not deice a frozen aerator, and therefore do not enable a frozen aerator to be started while the temperature remains below freezing. In fact, one would have to wait until the surrounding temperature rose above freezing and remained there long enough for the ice associated with the aerator to melt before using the aerator for its intended purpose.

Previous efforts to solve the above problems have included heating the aerator. Typically, the heating mechanisms used, due to their designs, had to be mounted outside of the aerator housing. Therefore, the externally provided heating mechanisms were located immediate to the heat sink, e.g., the ice, and radially separated from the dynamic mechanisms of the aerator by the entire aerator body. While affording simple mounting to aerator housings, heat transfer to the dynamic mechanisms of the aerator proved to be less than desirable or even ineffective.

One solution to this problem is described in commonly assigned, copending application Ser. No. 275,522, now U.S. Pat. No. 4,882,099. The application discloses an aspirator aerator including an outer tubular housing having an inner rotary driven member, such as a tube, disposed therein. A deicing mechanism is disposed between the inner tube and the outer tubular housing for deicing the aerator. This arrangement exhibits effective heat transfer characteristics and allows rapid deicing of the aerator under freezing, or even near arctic conditions, so as to prevent damage to the dynamic mechanisms of the aerator which are subject to the torque of the motor, and to prevent damage to the motor which enables the motor to remain in operation. While this arrangement is more effective than prior art heating mechanisms mounted outside the aerator housing, retrofitting the arrangement to existing aerators may prove difficult and requires the disassembly and reassembly of the aerator apparatus.

SUMMARY OF THE INVENTION

Accordingly, it is an object of the present invention to provide an aeration apparatus having a deicing mechanism which exhibits effective heat transfer characteristics and allows rapid deicing of the aerator under freezing, or even near arctic conditions, thereby preventing damage to the dynamic mechanisms of the aerator which are subject to the torque of the motor, and preventing damage to the motor which enables the motor to remain in operation.

It is another object of the present invention to provide a deicing mechanism which may be simply mounted to an aeration apparatus.

It is a further object of the present invention to deice an otherwise frozen and therefore inoperable aerator so that the aerator motor may operate, thereby enabling the aerator to function at temperatures below freezing.

It is yet a further object of the present invention to provide an aeration apparatus having a control mechanism for controlling the actuation of the deicing mechanism and motor in response to sensed icing conditions, to prevent motor operation when the aerator has iced, to automatically deice the aerator when an icing condition is sensed at start-up, and to start the aerator after the deicing operation has been completed.

In accordance with the present invention, an aspirator aerator for inducing the flow of atmospheric air at high velocity below the surface of a substance so as to allow oxygen to freely and quickly transfer into the substance is provided. The aerator includes an outer tubular housing having an inner rotary driven member, such as a tube, disposed therein. One end of the housing is associated with an aspiration mechanism for inducing fluid flow through the aerator, while the other end of the housing is associated with a driver for driving the aspiration mechanism. A heating element is disposed substantially around the outer surface of the outer tubular housing and generates sufficient heat to deice the aerator. An insulating layer is disposed substantially around the outer surface of the heating element to cause heat generated by the heating element to substantially flow inward, through the outer tubular housing.

The aerator may further be provided with a control circuit for controlling the operation of the drive and deicing mechanism in response to a signal denoting the presence or absence of icing conditions.

Other important features and advantages of the invention will be apparent from the following description and the accompanying drawings, wherein, for purpose of illustration only, a specific form of the invention is shown in detail.

BRIEF DESCRIPTION OF THE DRAWINGS

FIG. 1 is a perspective view of a float-support aerator in accordance with a preferred embodiment of the present invention.

FIG. 2 is a top plan view of the deicing mechanism in accordance with the present invention.

DETAILED DESCRIPTION OF THE PREFERRED EMBODIMENT

Figure 3:
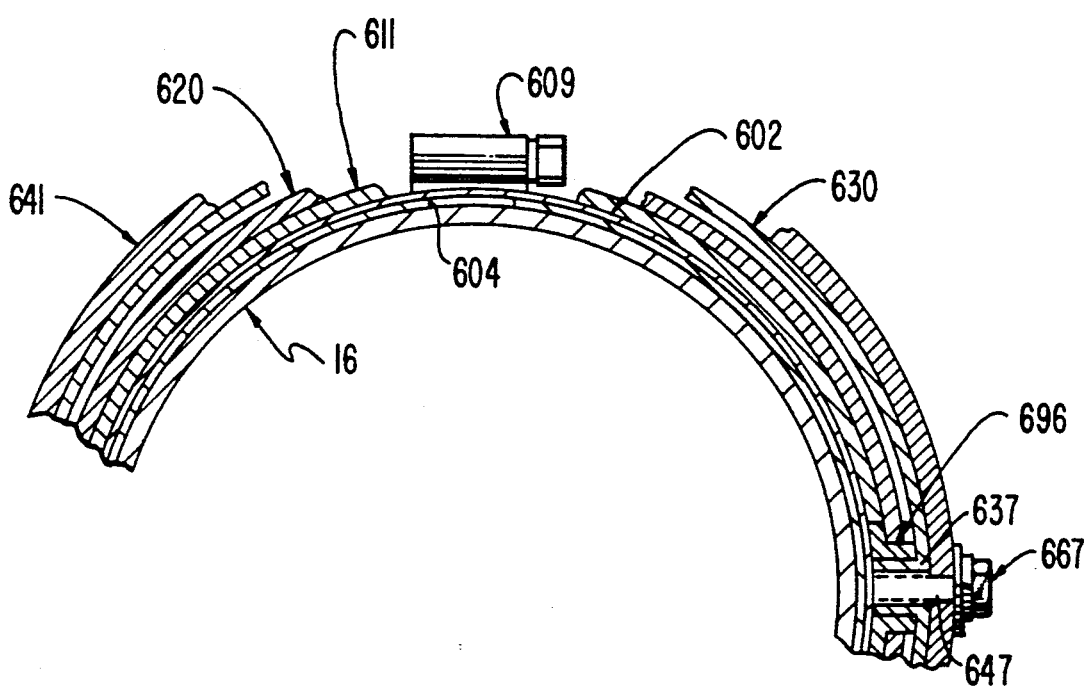
FIG. 3 is a cross-sectional view taken along line A—A' of FIG. 2.

Referring to the drawings in detail, wherein like numerals indicate like elements, FIG. 1 shows an apparatus according to a preferred embodiment of the invention. A propeller-type aspirating aerator 10 is attached to a support system 12 which is shown as supporting the aerator in a liquid. Although support system 12 is illustrated as a preferred embodiment, other support systems may be used without departing from the scope of the present invention.

Aerator 10 comprises a motor 14 attached to an outer tubular housing 16. Motor 14 is drivingly coupled to tube 18 which extends through the interior of housing 16 and out of its lower end where it is supported by a bearing mechanism (not shown). Propeller 20 is attached to the lower end of tube 18. Tube 18 functions as a rotary driven member coupled between motor 14 and propeller 20. When motor 14 rotates tube 18, propeller 20 drives the liquid surrounding it, thereby aspirating air down tube 18 and into the liquid. Alternatively tube 18 could be a solid member and air could be aspirated between the outer surface of such a solid member 18 and the inner surface of housing 16. Aerator 10, illustrated in FIG. 1, is a relatively small aerator, for example, a 2 to 15 horsepower aerator. However, other sized aerators may be used.

Support system 12 is a floatation type system, wherein a pair of floats 22 float on the liquid being aerated. Floats 22 function as vertical supports, i.e., providing support vertically above the liquid. A pair of horizontal support bars 24 are connected to floats 22 by mounting bars 26 carried in bar rests 28 on the upper surface of floats 22. Support bars 24 extend horizontally between floats 22 to function as a horizontal support which positions aerator 10 at a desired horizontal location (preferably centrally) between floats 22.

Another pair of support bars (not shown) or another support mechanism may further be included to function as a support for a vortex shield (not shown) at a desired horizontal location over propeller 20, as disclosed in U.S. Pat. No. 4,741,825 issued on May 3, 1988 to A. J. Schiller, of which the disclosure therein is hereby incorporated herein.

Figure 4:
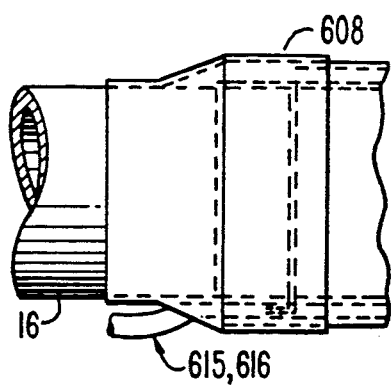
FIG. 4 is a side elevational view of the deicing mechanism of FIG. 2.

FIGS. 2, 3, and 4 will be used to illustrate the deicing mechanism of the present invention. The deicing mechanism 600 includes a cylindrical, inner heater wrap 602 having a longitudinal slit 604 and which is substantially disposed around the outer cylindrical surface of housing 16. Inner heater wrap 602 includes an attachment hole (not shown) which is aligned with a similar attachment hole (not shown) on housing 16 to assist in securing the deicing mechanism to the aerator housing. In a preferred embodiment, inner heater wrap 602 is formed of #21 Ga (0.033 IN) type 316 stainless steel. The outer cylindrical surface of inner heater wrap 602 is preferably grit blasted to enhance vulcanization of a heating element thereto as described below. It will be readily appreciated that other techniques may be employed to enhance bonding of the heating element to the inner heater wrap 602. Stainless steel band clamps 608, 609 are spot-welded at each end of inner heater wrap 602 and are tightened to securely attach deicing mechanism 600 to outer aerator housing 16. Longitudinal slit 604 enables the inner surface of inner heater wrap 602 to conform to outer aerator housing 16 when band clamps 608, 609 are tightened.

A flexible, etched-foil heating element 611 is bonded to inner heater wrap 602. The bonding may be achieved by vulcanization of the silicon rubber-encased heating element to the heater wrap, although the invention is not limited in this respect. As noted above, heater wrap 602 is preferably treated to enhance the bonding of the heating element thereto. Heating element 611 is preferably laminated between thin insulating layers of glass-reinforced silicone rubber. One such laminated heating element is available from Minco Products, Inc. under the trade name "Thermofoil." Power leads 615, 616 (FIG. 4) are electrically coupled to heating element 611 and are hermetically sealed against moisture contamination by vulcanization to the heating element insulating layers.

An outer wrap 620 is adhesively bonded to the outer surface of heating element 611. Outer wrap 620 preferably comprises a type SN410 closed cell neoprene insulating foam having a thickness of about $\frac{1}{8}$Δ to about $\frac{1}{8}$Δ. In one embodiment, outer wrap 620 comprises a one-eight ($\frac{1}{8}$) inch thick layer of closed cell neoprene insulating foam. The thickness of outer wrap 620 will depend on several factors including aerator size, the type of foam and the expected operating temperature range of the aerator, but, in general, the foam layer should be sufficient to ensure that the heat generated by heating element 611 substantially flows inward through the aerator housing, rather than escaping into the adjacent heatsink such as ice surrounding the deicing mechanism. Outer wrap 620 and inner wrap 611 are arranged so as not to overlay longitudinal slot 604.

An outer protective shell 630 is secured to inner heater wrap 602 by stand-offs and machine screw fasteners. Outer protective shell 630 is preferably formed of #13 Ga (0.090 IN) type 316 stainless steel tubing. Protective shell 630 is designed to protect the insulating outer wrap 620 and heating element 611 from direct contact with the substance being aerated and any contaminants contained therein. The protective layer further prevents the accidental tearing or ripping of the insulating layer.

End caps 640, 641 are disposed at each end of outer protective shell 630, each end cap including attachment holes 646, 647 for securing the respective end cap to outer protective shell 630. Attachment holes 646, 647 are aligned with attachment holes 636, 637 formed at each end of outer shell 630 and stainless steel sheet metal fasteners or mounting screws 667 are passed therethrough to secure the end caps to the shell. Shock mount 696 maintains a small gap between outer wrap 620 and protective shell 630. End caps 640, 641 are preferably hydrodynamically contoured to minimize hydraulic flow turbulence over the deicing mechanism, particularly in a floatation-type system as illustrated in FIG. 1, although the invention is not limited in this respect. End caps 640, 641 also afford further protection to insulating wrap 620 and heating element 611.

The procedure for attaching the deicing mechanism to the aerator will now be described. End cap 640 is slid over the aerator housing outer surface and temporarily located above the attachment point of the heater assembly. The deicing mechanism including inner heater wrap 602, heating element 611, outer wrap 620, and protective shell 630 is then slid over the housing and secured thereto using a stainless steel fastener passed through attachment holes formed therein. Band clamps 608, 609 are then tightened to firmly secure the deicing mechanism to the outer aerator housing 16. The lower end cap 641 is then slid over the housing. Both upper end cap 640 and lower end cap 641 are positioned over the heater assembly. Attachment holes 646, 647 on the respective end caps and attachment holes 636, 637 on protective shell 630 are aligned. Stainless steel sheet metal fasteners 667 are passed therethrough to secure the respective end caps to protective shell 630.

In the event that an aerator shuts down during extremely cold weather and becomes frozen into the surface ice, the deicing mechanism of the present invention heater may be employed to thaw the drive shaft from surrounding ice inside the housing and to thaw the ice plug from the inside of the drive shaft.

As described in detail below, the control circuitry is designed to cycle the heater on for a maximum of one hour, turn the heater off, and then start the aerator motor. While in operation, the heater drives sufficient heat through the housing to melt the ice between the housing inside diameter and the drive shaft outside diameter, then drives heat through the shaft wall to melt the ice plugging the inside diameter. The closed cell foam insulation encasing the heating element, insures that most of the heat generated by the heating element travels inward through the aerator housing, rather than escaping to the ice surrounding the heater assembly.

In addition, the deicing mechanism of the present invention may be simply and effectively mounted to an aerator housing. This is particularly desirable when it is desired to mount a deicing mechanism to an existing aerator apparatus. The provision of an insulating layer around the heating layer serves to overcome the prior art problem of inefficient deicing of the aerator due to heat transfer to the surrounding ice.

The specifications for deicing mechanisms for use with various aerators are set forth in Table I below.

TABLE I

| Aerator Size | Deicing Mechanism Length | Inner Wrap Inside Dia. | Active Heating Element | Power Requirements | | |
|---|---|---|---|---|---|---|
| | | | | Volts | Phase | Watts |
| 2-7½ HP | 31.00 | 3.5 IN | 24.00 IN | 240 | 1 | 2000 |
| | | | | 480 | 1 | 2000 |
| | | | | 640 | 1 | 2000 |
| 10-30 HP | 27.50 | 4.5 IN | 20.50 IN | 240 | 1 | 3200 |
| | | | | 480 | 1 | 3200 |
| | | | | 640 | 1 | 3200 |

Figure 5:
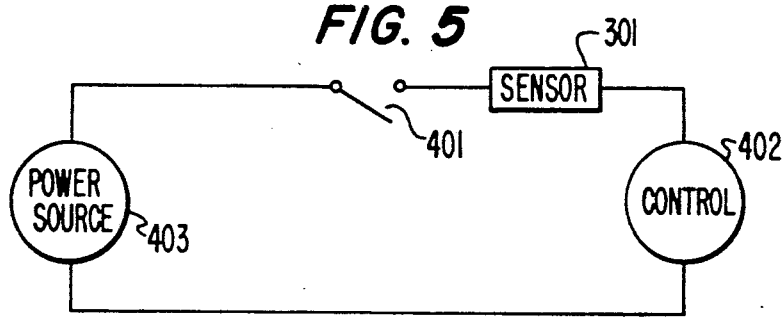
FIG. 5 is a block schematic diagram depicting an actuation circuit for the timed control device.
Figure 6:
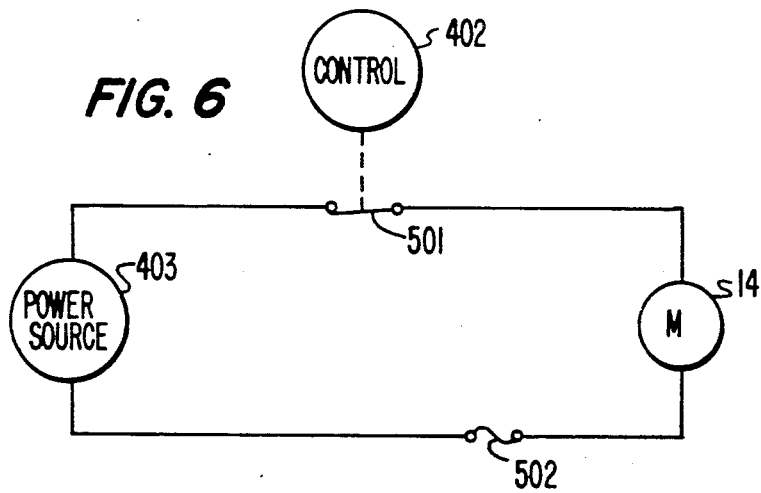
FIGS. 6 and 7 are block schematic diagrams depicting the timed control device of FIG. 4 controlling the power input to the motor and heater element, respectively.
Figure 7:
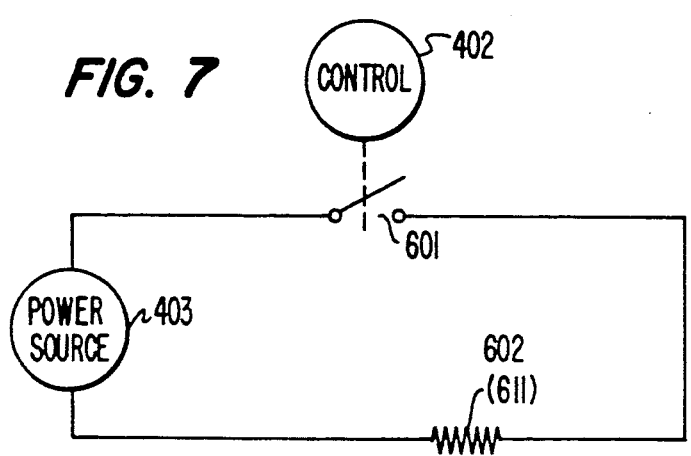

Referring now to FIGS. 5, 6 and 7, a control of heating element 611 for especially heating outer tubular housing 16 and inner tube 18 (FIG. 1; FIG. 2) and of aerator motor 14 (FIG. 1) will be described. A sensor, for example, of temperature within or without housing 16 indicates an icing condition within the housing and operates control device 402 when the aerator on-off switch 401 is closed, i.e., in the on position. When switch 401 is closed, if sensor 301 senses that no icing condition exists, switches 501 and 601 remain in their normal positions shown in FIGS. 6 and 7. With switch 501 closed, power is supplied to motor 14 and the aeration process begins. Also, with switch 601 in the open position, no power is supplied to heating element 611.

If sensor 301 senses an icing condition when switch 401 is closed, a time delay relay, or other timed control known in the art energizes control device 402 for a predetermined period of time. Control device 402 in turn actuates normally closed switch contact 501 of FIG. 5 and normally open switch contact 601 of FIG. 6 to their alternate states for the predetermined period of time while the time delay relay times out.

Referring now to FIG. 6, normally closed switch contact 501 opens so that power source 403 or alternative power to aerator motor 14 is turned off. Motor 14 is thus saved from damage or failure during a detected icing condition. Consequently, there is a direct relationship between detection of an icing condition and the turning off of power to aerator motor 14 whenever the aerator is initially turned on.

Supplementary protection of motor 14 is provided by fuse 502. When motor 14 is frozen or otherwise prevented from operation, or when it enters a fault condition caused by other conditions, it may cause excessive current draw from power source 403. Consequently, when the current drawn exceeds a predetermined value represented by the rating of fuse 502, motor 14 may likewise be saved from failure. Fuse 502 thus represents an alternative mode of saving motor 14 which does not necessarily relate to detection of an icing condition, may actuate more slowly than the present invention, and may be susceptible to human error. In the latter case, a user of the present invention may select a fuse 502 having too high a current rating to save motor 14. Thus, fuse 502 is supportive of, comprises a somewhat ineffective replacement for the present invention and represents the prior art. Furthermore, fuse 502 cannot perform the function of activating a heating element to alleviate the icing condition and subsequently activate the aerator in the manner of the present invention.

Referring now to FIG. 7, at the same time as motor 14 is turned off, normally open contact 601 is closed so that power is supplied to heating element 611. It is intended that the predetermined period of maintenance of contacts 501 and 601 in their alternate states is related to the duration for elimination of icing by heating element 611. In other words, the calorie output of heating element 611 must be related to the volume of ice to be melted in the vicinity of housing 16 and tube 18 and the capability of power source 403 to provide sufficient power which is relatively consistent over the time period.

Control device 402 most conveniently includes a time delay relay whose operation is not particularly sensitive to severe conditions of temperature and the like. However, control device 402 may comprise any other form of control such as a microprocessor having associated clocking or timing which controls motor 14 and heating element 611 according to a simple control program. Control device 402 may alternatively comprise a simple logic gate control circuit with an associated timing circuit.

Power source 403 may be an AC or DC power source having a plurality of taps at different voltage levels for operation of different elements at different voltages. It may further comprise voltage step-up or step-down circuits, or DC to AC or AC to DC converting circuits depending on the type of heating elements employed and their power requirements. It is most convenient if all elements operate from the same power source 403. However, it should be realized that the motor, control device and heater element may be energized by more than one or even separate power sources.

Figure 8:
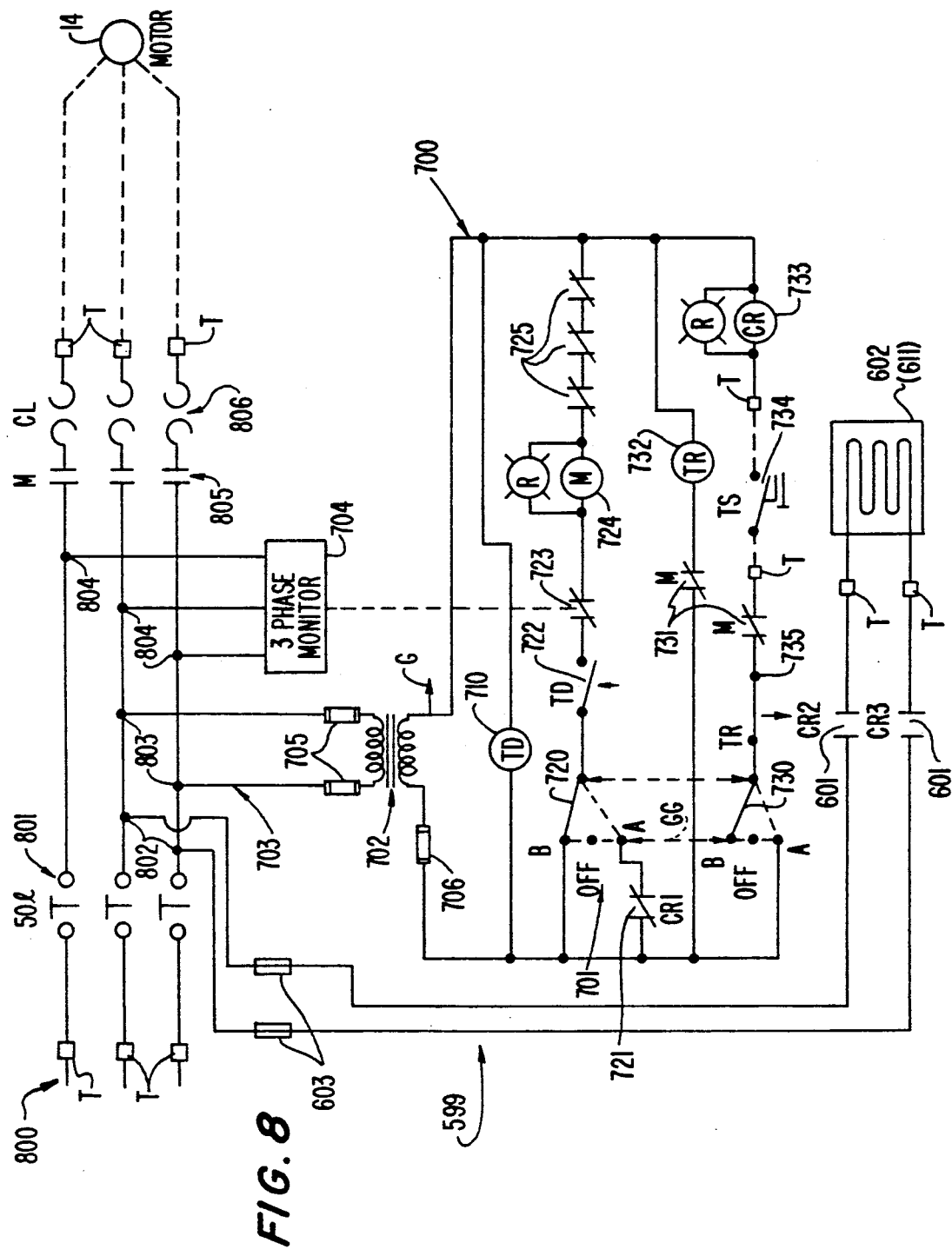
FIG. 8 shows a detailed schematic diagram of a motor-heater control circuit, in accordance with a preferred embodiment of the invention.

FIGS. 5, 6 and 7 depict the basic circuit for controlling the operation of the aerator motor and heater element in response to icing conditions. It should be understood that numerous combinations of elements may be arranged to achieve the above described control without departing from the scope of the invention. FIG. 8 is an example of one of such combinations.

Referring to FIG. 8, all T's designate an electric terminal. Three phase (3) power, which, for example, may be 208, 230, 460, 375, 550 or some other voltage depending on location, is provided to main power circuit 800 which includes main breaker 801. Main power circuit 800 delivers single phase power to heater circuit 599 and control circuit 700 through taps 802 and 803, respectively, and three phase power to motor 14. Control circuit 700 controls the power delivery to motor 14 and heating element 611. Main power circuit 800 further includes motor starter contacts 805 and current overload heater elements 806 which may be of the bimetallic type. Taps 804 lead to three phase balance monitor 704.

Heater circuit 599 includes 15 amp fuses 603, heater switch contacts 601, which are controlled by control circuit 700, and heating element 611.

Control circuit 700 comprises single phase input circuit 703, which includes two 2-amp fuses 705, and step-down transformer 702. If the main power is 460 volts, step-down transformer 702, preferably having a 3:1 step-down tap, transforms the 460 volt input to 120 volts. On one side of transformer 702 is ground G, and on the other side thereof is 3 amp fuse 706 to protect the other elements of the control circuit against current exceeding 3 amps. Control circuit 700 further comprises aerator on-off ganged switch 701 having motor control branch switch 720 ganged to temperature control branch switch 730 through ganging member GG. Switch 701 is a three position switch. Upper position B actuates the testing circuit which effectively cuts out the temperature control circuit and corresponding motor switch contacts 721 so that only the motor operation is tested. Lower position A of switch 701 places both the motor control branch and temperature control branch into the effective circuit so that control circuit 700 may appropriately respond to sensed icing coditions. The intermediate position of switch 701 is the off position.

The motor control branch comprises motor switch contacts 721, branch switch 720 and time delay switch 722 which is normally open. Motor time delay 710 always remains in the circuit and closes switch 722 once a preselected interval of time has expired after actuation of switch 701. Time delay 710, for example, may have a time selection range of 1-10 seconds. Time delay 710 and time delay switch 722 perform a protective function by delaying the energization of motor 14. For example, time delay 710 performs the function of delaying the start of motor 14 until main control relay 733, discussed below, has had time to open motor switch contacts 721 when an iced condition has been sensed. The motor control branch further comprises normally closed three phase monitor control switch 723 which opens in response to three phase balance monitor 704 sensing an excessive imbalance between any two of the three motor input lines. Monitor 704 and switch 723 are optional and merely represent a further motor protection mechanism. Continuing along the motor control branch, when motor relay 724 is energized, i.e., when time delay 710 closes time delay switch 722, motor relay 724 opens normally closed auxiliary motor contacts 731 and closes motor starter contacts 805. When this occurs, running light R, which is in parallel with motor relay 724, turns on, thereby indicating that motor 14 is operating. Normally closed contacts 725 are coupled with current overloads 806. Contacts 725 open when current overloads 806 sense excessive motor current draw.

The temperature control branch of control circuit 700 comprises temperature control branch switch 730, auxiliary motor contacts 731, heating element deenergization time delay 732 having, for example, a time selection range of 1 to 240 minutes, main control relay 733, adjustable temperature thermostat or adjustable temperature sensor switch 734, and time delay switch 735. The operation of the control circuit when aerator on-off switch 701 is placed in the A position and actuated will now be described. Adjustable temperature sensor switch senses the temperature of ambient air and compares the sensed temperature to a preselected control temperature in the range of 10°-32° F., inclusive. Preferably, the control temperature is selected to be 28° F. and for purposes of this example 28° F. will be used. Therefore, when the ambient air temperature is above 28° F., sensor switch 734 remains open. As a result, main control relay 733 remains deenergized and normally open heater switch contacts 601 remain open, while normally closed motor switch contacts 721 remain closed. Therefore, once the preselected time of motor time delay 710 has expired, motor relay 724 opens auxiliary motor contacts 731 and closes motor starter contacts 805 which energize the aerator.

When temperature sensor 734 senses an ambient temperature below the preselected temperature, for example, 28° F., a different sequence results. When such an icing condition is sensed, temperature sensor switch 734 closes and energizes heating element deenergization time delay 732. In turn, time delay 732 delays the opening of normally closed time delay switch 735 for a preselected interval selected from a range of, for example, 1 to 240 minutes. While time delay switch 735 is closed, main control relay 733 is energized. While energized, relay 733 opens motor switch contacts 721 and closes heater switch contacts 601. As a result, no power is delivered to aerator motor 14, but power is delivered to heating element 611. Prior to energization of main control relay 733, motor time relay 710 caused motor 14 to remain deenergized as discussed above. Therefore, motor time relay 710 protects motor 14 in the case where the response time of the temperature control circuit, which opens motor switch contacts 721, would be inadequate due to conditions such as low temperatures. During the above-described deicing state, running light R, which is in parallel with main control relay 733, turns on, thereby indicating that heating element 611 is energized. The other running light, which is in parallel with motor relay 724, remains off, thereby indicating that motor 14 is not operating. Once the preselected deenergization time delay interval has expired, time delay 732 deenergizes and opens time delay switch 735. In turn, main control relay 733 deenergizes and heater switch contacts 601 open, while motor switch contacts 721 close. At this time, energization time delay 710 most probably has closed time delay switch 722 due to the time that has elapsed. Consequently, motor relay 724 is energized which opens auxiliary motor contacts 731, thereby taking the temperature sensor and heating element out of the effective circuit. Energized motor relay 724 also closes motor starter contacts 805, thereby starting the operation of the aerator.

Having described the invention in detail, it will be recognized that the foregoing is considered as illustrative only of the principles of the invention. Since numerous modifications and changes will readily occur to those skilled in the art, it is not desired to limit the invention to the exact construction, materials assembly and so forth shown and described. Accordingly, all suitable modifications and equivalents may be resorted to the extent they fall within the scope of the invention and claims appended hereto.

We claim:

1. An aspirator aerator for inducing a flow of atmospheric air at high velocity below a surface of a substance so as to allow oxygen to freely and quickly transfer into the substance, said aspirator aerator comprising:
   an outer tubular housing having an inner rotary driven member disposed therein, one end of said housing being associated with aspiration means for inducing fluid flow through the aerator, the other end of said housing being associated with driving means for driving said rotary driven member and said aspiration means;
   heating means disposed substantially around the outer surface of said outer tubular housing for generating sufficient heat to deice the aerator;
   insulation means disposed substantially around the outer surface of said heating means for causing heat generated by said heating means to substantially flow inward through said outer tubular housing; and
   control means for controlling said driving means and said heating means in response to a signal denoting the presence or absence of icing conditions.

2. The aspirator aerator in accordance with claim 1 wherein said heating means comprises a flexible heating element laminated between first and second layers of glass-reinforced silicone rubber.

3. The aspirator aerator in accordance with claim 1 further comprising:
   wrap means bonded to said heating means for securing said heating means to said outer tubular housing.

4. The aspirator aerator in accordance with claim 1 wherein said insulation means comprises a closed cell foam.

5. The aspirator aerator in accordance with claim 1 further comprising:
   protective shell means disposed substantially around said insulation means for protecting said insulation means and said heating means.

6. The aspirator aerator in accordance with claim 5 further comprising:
   first and second end caps secured to said protective shell means for further protecting said insulation means and said heating means.

7. The aspirator aerator in accordance with claim 6 wherein said first and said second end caps are hydrodynamically contoured to reduce hydraulic flow turbulence.

8. The aspirator aerator in accordance with claim 1 wherein said control means comprises a timed control device operatively associated with said driving and heating means for controlling input power to said driving and heating means.

9. The aspirator aerator in accordance with claim 8 wherein said timed control device includes timing means for holding the timed control device actuated for a predetermined period of time in response to said signal denoting the presence of an icing condition, thereby maintaining the heating means actuated and the driving means deactuated for said predetermined period of time.

10. A deicing apparatus for an aspirator aerator comprising an outer tubular housing having an inner rotary driven member disposed therein, said deicing apparatus comprising:
    heating means disposed substantially around the outer surface of said outer tubular housing for generating sufficient heat to deice the aerator;

insulation means disposed substantially around the outer surface of said heating means for causing heat generated by said heating means to substantially flow inward through said outer tubular housing;

protective shell means disposed substantially around said insulation means for protecting said insulation means and said heating means; and first and second end caps secured to said protective shell means for further protecting said insulation means and said heating means, wherein said first and second end caps are hydrodynamically contoured to reduce hydraulic flow turbulence.

11. The deicing apparatus in accordance with claim 10 wherein said heating means comprises a flexible heating element laminated between first and second layers of glass-reinforced silicone rubber.

12. The deicing apparatus in accordance with claim 10 further comprising:

wrap means bonded to said heating means for securing said heating means to said outer tubular housing.

13. The deicing apparatus in accordance with claim 10 wherein said insulation means comprises a closed cell foam.

14. An aspirator aerator for inducing a flow of atmospheric air at high velocity below a surface of a substance so as to allow oxygen to freely and quickly transfer into the substance, said aspirator aerator comprising:

an outer tubular housing having an inner rotary driven member disposed therein, a first end of said housing being associated with aspiration means for inducing fluid flow through said aerator, a second end of said housing being associated with driving means for driving said rotary driven member and said aspiration means;

heating means disposed substantially around the outer surface of said outer tubular housing for generating heat to deice said aerator;

means disposed substantially around the outer surface of said heater means for causing heat generated by said heating means to substantially flow inward through the outer surface of said outer tubular housing; and control means for controlling the operation of said driving means in response to a signal denoting the presence or absence icing conditions within said outer tubular housing.

15. The aspirator aerator in accordance with claim 14 wherein said control means comprises a timed control device operatively associated with said driving means for controlling input power to said driving means.

16. The aspirator aerator in accordance with claim 15 wherein said timed control device includes timing means for holding the timed control device actuated and said driving means deactuated for a predetermined period of time.

17. An aspirator aerator for inducing a flow of atmospheric air at high velocity below a surface of a substance so as to allow oxygen to freely and quickly transfer into the substance, said aspirator aerator comprising:

an outer tubular housing having an inner rotary driven member disposed therein, a first end of said housing being associated with aspiration means for inducing fluid flow through said aerator, a second end of said housing being associated with driving means for driving said rotary driven member and said aspiration means;

heating means disposed substantially around the outer surface of said outer tubular housing for generating heat to deice said aerator;

means disposed substantially around the outer surface of said heater means for causing heat generated by said heating means to substantially flow inward through the outer surface of said outer tubular housing; and control means for controlling the operation of said heating means in response to a signal denoting the presence or absence of icing conditions within said outer tubular housing.

18. The aspirator aerator in accordance with claim 17 wherein said control means comprises a timed control device operatively associated with said heating means for controlling input power to said heating means.

19. The aspirator aerator in accordance with claim 18 wherein said timed control device includes timing means for holding the timed control device actuated and the heating means actuated for a predetermined period of time.

* * * * *